(12) United States Patent
Liu et al.

(10) Patent No.: US 10,794,869 B2
(45) Date of Patent: Oct. 6, 2020

(54) ACOUSTIC EMISSION SENSOR

(71) Applicants: Sichuan University, Chengdu (CN); Research Institute of Petroleum Exploration & Development, PetroChina Company Limited, Beijing (CN)

(72) Inventors: Jianfeng Liu, Chengdu (CN); Huining Xu, Chengdu (CN); Jianliang Pei, Chengdu (CN); Lu Wang, Chengdu (CN); Chunping Wang, Chengdu (CN); Xiaozhang Lei, Chengdu (CN); Wenxi Fu, Chengdu (CN); Jianhui Deng, Chengdu (CN)

(73) Assignees: SICHUAN UNIVERSITY, Chengdu (CN); RESEARCH INSTITUTE OF PETROLEUM EXPLORATION & DEVELOPMENT, PETROCHINA COMPANY LIMITED, Beijing (CN)

(*) Notice: Subject to any disclaimer, the term of this patent is extended or adjusted under 35 U.S.C. 154(b) by 168 days.

(21) Appl. No.: 16/016,829

(22) Filed: Jun. 25, 2018

(65) Prior Publication Data
US 2018/0372690 A1    Dec. 27, 2018

(30) Foreign Application Priority Data
Jun. 23, 2017    (CN) .......................... 2017 1 04880697

(51) Int. Cl.
*G01N 29/14* (2006.01)
*E21B 49/00* (2006.01)
(Continued)

(52) U.S. Cl.
CPC ............. *G01N 29/14* (2013.01); *E21B 47/12* (2013.01); *E21B 49/008* (2013.01); *G01N 29/2475* (2013.01)

(58) Field of Classification Search
CPC ........ G01V 1/166; G01V 1/181; G01V 1/135; G01V 1/52; G01N 29/14; G01N 29/2475;
(Continued)

(56) References Cited

U.S. PATENT DOCUMENTS

| | | | |
|---|---|---|---|
| 8,950,260 B2 * | 2/2015 | Gelinske | G01F 1/666 73/1.16 |
| 2010/0313661 A1 * | 12/2010 | Liu | G01N 29/14 73/587 |

(Continued)

*Primary Examiner* — Helen C Kwok
(74) *Attorney, Agent, or Firm* — Bayramoglu Law Offices LLC (57) ABSTRACT

The present invention discloses an acoustic emission sensor, including an acoustic emission probe, a probe installation mechanism, and a transmission mechanism transmitting a combination of the acoustic emission probe and the probe installation mechanism to a setting position in a borehole of a monitored rock mass; the probe installation mechanism includes a shell, a probe sleeve, a spring sleeve, a spring, and a fixed pulley component; the probe sleeve is installed in the guide cylinder of the shell, the spring sleeve is fixed on two sides of the probe sleeve, the spring is installed inside the spring sleeve; one end of the first rope in the fixed pulley component is fixedly connected to the end cap in the upper end surface of the probe sleeve through the fixed pulley mounted on the top of the inner wall of the shell.

20 Claims, 7 Drawing Sheets

(51) Int. Cl.
*G01N 29/24* (2006.01)
*E21B 47/12* (2012.01)

(58) Field of Classification Search
CPC .. G01N 29/28; E21B 7/12; E21B 7/14; E21B 9/008
See application file for complete search history.

(56) References Cited

U.S. PATENT DOCUMENTS

| | | | |
|---|---|---|---|
| 2010/0313662 A1* | 12/2010 | Liu | G01N 29/14 73/587 |
| 2012/0261363 A1* | 10/2012 | Liu | G01N 29/14 211/26 |
| 2018/0372689 A1* | 12/2018 | Liu | E21B 47/14 |
| 2018/0372892 A1* | 12/2018 | Zheng | G01V 1/135 |
| 2018/0372893 A1* | 12/2018 | Liu | G01V 1/166 |

* cited by examiner

ACOUSTIC EMISSION SENSOR

CROSS REFERENCE TO RELATED APPLICATIONS

This application is based on and claims priority to the Chinese patent application No. 2017104880697, filed on Jun. 23, 2017, the entire contents of which are incorporated herein by reference.

TECHNICAL FIELD

The present invention relates to the technical field of rock (rock mass) engineering safety monitoring in engineering construction and relates to an acoustic emission sensor.

BACKGROUND

Rock (rock mass) deformation and damage in engineering construction, especially rock burst dynamic disaster, may directly endanger the safety of the construction and can even cause catastrophic impact. Therefore, effective monitoring and prediction of rock (rock mass) stability and rock burst dynamic disaster is one of the important contents of construction safety. Currently, as an important means of non-destructive monitoring, acoustic emission is used for the monitoring and prediction of rock (rock mass) stability and rock burst dynamic disaster in engineering construction.

During the construction of surrounding rock excavation in underground engineering, acoustic emission sensors need to be arranged in a three-dimensional spatial distribution in the monitored surrounding rock area before the excavation of the rocks in order to accurately predict the possible deformation and failure of the surrounding rock and the dynamic disaster. The more are the sensors arranged, the more accurate will be the monitoring.

In specific implementations, it is necessary to drill a hole in the rock (rock mass) by a drilling machine before the excavation of the rock (rock mass). The depth of the borehole increases with the increase of burial depth of the project and the monitored area. However, the deeper the borehole, the more difficult it is to install the acoustic emission sensor. At present, the installation methods of acoustic emission sensors mainly include the following types:

(1) At the engineering site, the acoustic emission probe is usually placed directly in the borehole, and the residual liquid medium (such as water) in the borehole is used as a medium for signal transmission between the rock mass and the acoustic emission probe. The acoustic emission probe transmits the received detection signal to the ground monitoring system through the cable. However, this method has the following disadvantages: first, this implementation is only suitable for boreholes in a downward direction, but not suitable for boreholes that are completely horizontal or have upward angles due to the difficulty in storing the medium; even for boreholes that are downward, it is still necessary that the rock mass around the borehole is relatively intact, so as to avoid loss or seepage of transmission medium from the cracks in the borehole and ensure that the acoustic emission probe is always in the transmission medium, but in actual situation on site, it is difficult to meet this requirement, thereby affecting the monitoring effect; second, although the liquid between the rock mass and the acoustic emission probe can be used as a coupling medium for signal transmission, the density of the liquid is generally relatively low, and the signal transmission effect of the liquid is not as good as that of the detection signal received by directly contacting the acoustic emission probe with the rock wall.

(2) In order to ensure effective coupling between the acoustic emission probe arranged in the borehole and the wall of the borehole, cement is poured into the borehole at the project site to make the acoustic emission probe and the rock wall as a whole. This method can solve the problem of effective transmission of detection signals, but it still has the following disadvantages: first, the acoustic emission probe after pouring cement cannot be recycled, resulting in high monitoring costs; second, if there is no signal or the signal is bad after pouring cement, the acoustic emission probe cannot be checked or adjusted, it is necessary to re-drill a hole and re-install new acoustic emission sensors, which not only leads to excessive monitoring costs, but also leads to delay in the project and even extends the construction period; third, while pouring cement slurry into the borehole, because the borehole is deep, not only the grouting effect of the installation site of the acoustic emission probe is difficult to be guaranteed, but the situation that the installation site of the acoustic emission probe fails to achieve effective grouting may occur, thus the acoustic emission probe will not be effectively coupled to the rock wall and no monitoring signal will be generated. Moreover, the deeper the borehole, the greater will be the total shrinkage deformation of the poured cement after solidification, and the signal transmission cable cemented with the cement will be subjected to tensile force due to shrinkage deformation of the cement, resulting in failing to transmit signals effectively; fourth, the blasting of explosives during the excavation process may loosen the grouting surface and the rock wall surface, resulting in a decrease in the transmission effectiveness of monitoring signal; fifth, the borehole is usually relatively moist, and the solidification of the cement slurry after pouring requires a long cycle, which will lead to the extension of the construction period; moreover, the installation process takes time and effort, requiring a series of professional grouting equipment and grouting personnel, thereby further increasing the monitoring costs.

(3) Another implementation is to use a simple fixed mounting device, the acoustic emission probe is fixed inside the fixed device, after the fixed device is sent to the installation site with a rigid non-movable metal transmission rod, the acoustic emission probe is pushed out by pressure to contact with the rock wall of the borehole to achieve fixation. This method has the advantage of achieving the contact between the acoustic emission probe and the rock wall in the non-grouting situation, but the following disadvantages still exist: first, since the distance between the fixed mounting device and the wall of the borehole is very short, this method requires that the fixed mounting device and the borehole are basically concentric structures and requires the borehole with a smooth wall, but these requirements cannot be guaranteed in actual construction; second, the fixed mounting device has a large size and is only applicable to large-diameter borehole, resulting in a high drilling cost; third, the entire transmission rod and the mounting device are rigidly inserted into the borehole by applying force, not only the friction force is high, prone to wear out the cable or acoustic emission probe, but also the transmission rod and the mounting device can easily stuck in the borehole and cannot be sent to the installation site; fourth, since the fixed mounting device is rigidly inserted into the borehole by external force, the installation process is not only time-consuming and laborious, but also has extremely low work efficiency; fifth, since the wall of the borehole is a cylindrical surface and the end surface of the acoustic emission probe is a plane, to ensure that the end surface of the acoustic emission probe is effectively coupled with the wall of the borehole is also a problem to be solved in practical applications.

Based on the drawbacks and deficiencies in the above various implementations, acoustic emission detection has been limited in the promotion and application of the monitoring of rock (rock mass) stability and rock burst dynamic disaster.

Therefore, how to conveniently and effectively install the acoustic emission probe in the borehole and effectively couple the installed acoustic emission probe with the wall of the borehole are still difficult points for on-site monitoring and research due to lack of relevant test methods and technical support.

SUMMARY

The objective of the present invention is to provide an acoustic emission sensor in view of the deficiencies in the prior art, so as to facilitate the installation of the acoustic emission sensor, realize the effective coupling between the acoustic emission probe and the hole wall of the borehole, ensure the effectiveness of the detection signal of acoustic emission probe, and facilitate recycling.

The acoustic emission sensor of the present invention includes an acoustic emission probe, a probe installation mechanism, and a transmission mechanism transmitting a combination of the acoustic emission probe and the probe installation mechanism to a setting position in a borehole of a monitored rock mass, a number of the acoustic emission probes is at least one, and a number of the probe installation mechanisms are same as the number of the acoustic emission probes;

the probe installation mechanism includes a shell, a probe sleeve, an end cap, a guide rod, a spring sleeve, a spring, a baffle, a pin, a fixed pulley component and a connection component;

the shell is a thin-walled cylindrical body with two open ends; a frame and a guide cylinder for combining with the probe sleeve are provided in an inner hole of the shell, the frame is located at a top of an inner wall of the shell, and the guide cylinder is located at a bottom of the inner wall of the shell, an inner hole of the guide cylinder is a through hole passing through a wall of the shell, and a first pin hole is arranged on a wall of the guide cylinder, a centerline of the frame is in line with a centerline of the guide cylinder and is perpendicular to a centerline of the shell;

the probe sleeve is a cylinder with a closed lower end and an open upper end, an inner hole of the probe sleeve is in clearance fit with the acoustic emission probe, and an outer shape of the probe sleeve is in clearance fit with the inner hole of the guide cylinder, a lower end surface of the probe sleeve is an arc surface matched with an arc of the borehole of the monitored rock mass, a lower section of the probe sleeve is provided with a second pin hole combined with the guide cylinder, an upper wall of the probe sleeve is provided with one or two notches for a cable connector of the acoustic emission probe to protrude, if the upper wall of the probe sleeve is provided with two notches, the two notches are axially symmetrically distributed with respect to a centerline of the probe sleeve;

the spring sleeve is a cylinder with two open ends, an inner wall of a lower end of the spring sleeve is provided with a slot combined with the baffle and is provided with a baffle outlet, a number of the spring sleeve is two, the two spring sleeves are axially symmetrically fixed on an outer wall of the probe sleeve with respect to the centerline of the probe sleeve, and connection line of projections of centerlines of the two spring sleeves on a horizontal plane is perpendicular to a projection of a centerline of the notch on the horizontal plane, two sets of connection components are respectively installed at the two ends of the shell;

the acoustic emission probe is installed in the probe sleeve, the cable connector of the acoustic emission probe extends from the notch arranged on the wall of the probe sleeve; the probe sleeve installed with the acoustic emission probe is placed in the shell, the lower section of the probe sleeve is inserted into the guide cylinder provided on the shell and a lower end of the probe sleeve is located outside the shell, an upper section of the probe sleeve is located in the frame provided on the shell, a placement orientation of the probe sleeve should make the cable connector of the acoustic emission probe face an end of the shell;

the end cap covers an upper end surface of the probe sleeve and is detachably connected to the probe sleeve;

a number of baffles are two, the two baffles are respectively installed in the slots arranged on the two spring sleeves and are connected with a third rope;

a number of guide rods are two, first ends of the two guide rods are respectively connected with two side plates of the frame provided on the shell, and second ends of the two guide rods are respectively inserted into the two spring sleeves;

a number of springs are two, two springs are respectively sleeved on the two guide rods, first ends of the two springs are respectively connected with plate bodies of corresponding parts of the frame, and second ends of the two springs are respectively contacted with corresponding baffles;

the fixed pulley component includes a fixed pulley and a first rope, the fixed pulley is installed on the top of the inner wall of the shell and is located in the frame;

a first end of the first rope is connected with a central part of the end cap, and a second end of the first rope extends out of the shell after passing through the fixed pulley;

a second rope is connected to the pin, the pin is inserted into the first pin hole of the guide cylinder and the second pin hole of the probe sleeve to connect the probe sleeve with the guide cylinder so that the spring is in a stretched or free state;

the transmission mechanism is connected to the connection component mounted on the shell.

In the above-mentioned acoustic emission sensor, the outer shape of the probe sleeve is in clearance fit with the inner hole of the guide cylinder so as to ensure that the direction of movement of the probe sleeve in the shell does not change; in addition, the size of the inner hole of the frame provided in the shell is larger than the outer diameter of the probe sleeve, allowing sufficient space for movement of the probe sleeve.

In the above-mentioned acoustic emission sensor, the second rope and the third rope are respectively installed on the pin and the baffle to facilitate pulling out the sleeve installed on the lower spring sleeve and the pin for fixing the lower guide cylinder and the probe sleeve; the first rope, the second rope and the third rope used in the present invention are steel wire ropes.

In the above-mentioned acoustic emission sensor, in order to facilitate pulling the first rope, an installation site of the fixed pulley on the top of the inner wall of the shell should make an included angle $\alpha$ between a section that is from a connection end of the first rope with the end cap to a contact part of the fixed pulley and the centerline of the probe sleeve ranges from 0° to 45° when the first rope is in working condition, preferably from 30° to 45°. In addition, for the convenience of operation, the first rope and the third rope can be merged as one rope and then connected to the ground. In order to ensure the pulling sequence of the rope (first pulling the third rope out of the baffle and then pulling the first rope to retrieve the probe), before the first rope and the third rope are merged, the length of the first rope needs to be more than three times of that of the third rope.

In the above-mentioned acoustic emission sensor, in order to facilitate installation, the shell is formed by a combination of two semi-cylinders; the present invention realizes the fixation of the two semi-cylinders through a connection piece and a screw, this connection method is relatively fixed and stable, but this is not the only way to achieve this connection. Those skilled in the art can also choose other connection methods that have been disclosed in the art to achieve the fixation, for example, two semi-cylinders can be connected by snap-fitting or welding, etc. to achieve a fixed connection.

In the above-mentioned acoustic emission sensor, in order to facilitate drawing forth the cable connected with the acoustic emission probe, the notch for the extending out of the cable connector of the acoustic emission probe provided on an upper end wall of the probe sleeve is a U-shaped notch, and the width of the U-shaped notch is slightly larger than the diameter of the cable connector of the acoustic emission probe.

In the above-mentioned acoustic emission sensor, in order to further improve the signal transmission effect of the acoustic emission probe, a coupling agent can be coated on the lower end surface of the acoustic emission probe that is in contact with the bottom of the probe sleeve so that the lower end surface of the acoustic emission probe is in effective contact with the bottom of the probe sleeve; the coupling agent is butter, vaseline, and the like.

In the above-mentioned acoustic emission sensor, the connection component includes a nut and at least two sets of connection brackets, a first end of each connection bracket is evenly distributed around an outer wall of the nut and is hinged with the outer wall of the nut, a second end of each connection bracket is fixedly connected with the shell; the connection component allows the installation mechanism to rotate within a limited range to further ensure that the top of the shell and the bottom of the probe sleeve are in effective coupling contact with the hole wall of the borehole.

In the above-mentioned acoustic emission sensor, in order to facilitate sending the installation mechanism installed with the acoustic emission probe to the setting position of the borehole to be installed, reduce the difficulty of manual operation and wear out of the cable or probe installation mechanism caused by excessive friction during transmission, the transmission mechanism includes a transmission rod, a connection rod and a roller component;

a connection screw hole is provided at a center of a first end of the transmission rod, and a connection hole is provided at a center of a second end of the transmission rod, a first fastening screw is provided on a hole wall of the connection hole, a type and a size of an internal thread of the connection screw hole are the same as a type and a size of an internal thread of the nut in the connection component;

the connection rod includes a threaded section and a column section, the connection rod is used for a connection of the transmission rod with the connection component and a connection between transmission rods, a type and a size of an external thread of the threaded section are matched with the type and the size of the internal thread of the connection screw hole provided on the transmission rod, a shape and a size of the column section are matched with a shape and a size of the connection hole provided in the transmission rod, when the column section of the connection rod is inserted into the connection hole of the transmission rod, the column section of the connection rod and the connection hole are fixed by the first fastening screw;

the roller component comprises a roller, an U-shaped installation plate, an axle and a roller sleeve, a number of the rollers are two or three, a number of the U-shaped installation plates and a number of the axles are the same as a number of the rollers, each roller is respectively mounted on a corresponding axle, two ends of each axle are respectively mounted on two side plates of a corresponding U-shaped installation plate so that each roller is located between the two side plates of the corresponding U-shaped installation plate; a diameter of an inner hole of the roller sleeve is larger than an outer diameter of the transmission rod, a second fastening screw is arranged on a wall of the roller sleeve, each U-shaped installation plate is fixedly attached to an outer wall of the roller sleeve; when a number of U-shaped installation plates are two, an included angle between centerlines of two U-shaped installation plates is 120° to 135°; when the number of U-shaped installation plates are three, centerlines of two U-shaped installation plates are in a straight line, and included angles between a centerline of remaining U-shaped installation plate and the centerlines of the two U-shaped installation plates are both 90°;

each transmission rod is provided with at least one set of roller component, the roller sleeve of the roller component is sleeved on the transmission rod and is fixed by the second fastening screw.

In the above-mentioned acoustic emission sensor, in order to send the probe installation mechanism to a deeper borehole, the number of transmission rods may be multiple, the two adjacent transmission rods are connected by a connection rod, and the transmission rod and the connection rod are fixed by a first fastening screw; during installation and disassembly, this connection method does not require the rotation of two adjacent transmission rods, on the one hand, it is possible to avoid friction between the probe installation mechanism and the borehole due to the rotation of the transmission rod, and on the other hand, it is possible to avoid erroneous operations due to the intertwining of multiple ropes connected to limiting pins caused by the rotation of the transmission rod.

In the above-mentioned acoustic emission sensor, in order to facilitate fixing the roller component, the transmission rod and the connection rod together, the first fastening screw and the second fastening screw may be the same fastening screw; during installation, the fastening screw hole of the transmission rod can be firstly aligned with the fastening screw hole of the roller sleeve, then the fastening screw passes through the two fastening screw holes with the fastening screw against the column section of the connection rod to fix the roller component, the transmission rod and the connection rod together.

In the above-mentioned acoustic emission sensor, the number of the probe installation mechanisms are same as the number of acoustic emission probes, a plurality of acoustic emission probes may be arranged along the axial direction of the borehole in the same borehole according to actual needs, and the orientation of different acoustic emission probes can be set according to actual monitoring requirements; two adjacent acoustic emission sensors are connected by a transmission mechanism.

The working principle of the acoustic emission sensor of the present invention is as follows:

The acoustic emission sensor uses the first rope and the spring to cooperate to control the direction of movement of the shell and the probe sleeve. In the initial state, the guide cylinder of the shell and the probe sleeve are connected by a pin, the overall size of the combination of the acoustic emission probe and the probe installation mechanism is smaller than the size of the borehole to be installed, so that the combination of the acoustic emission probe and the probe installation mechanism can move freely within the borehole, and the spring in the spring sleeve is in a compressed state. After the pin is pulled out by the second rope, the connection between the shell and the probe sleeve is eliminated, the pressure on the spring is reduced. Under the action of elastic restoring force of the spring, the shell and the probe sleeve move in two opposite directions respectively so as to make the top of the shell and the lower end surface of the probe sleeve closely contact with the inner wall of the borehole. Therefore, the effective coupling between the acoustic emission probe and the borehole wall can be ensured, and the working conditions of the signal monitoring of the acoustic emission probe can be satisfied. When the monitoring work is completed, the baffle installed in the slot provided on the probe sleeve is pulled out using the third rope so as to leave the spring in a free state, and then pulling the first rope, so the lower end of the probe sleeve is separated from the inner wall of the borehole, so that the overall size of the combination of the acoustic emission probe and the probe installation mechanism is again smaller than the size of the borehole, so that the acoustic emission probe can be recycled.

Compared with the prior art, the present invention has the following beneficial effects:

1. The acoustic emission sensor of the present invention can achieve the control of the direction of movement of the probe sleeve through the cooperation of the first rope disposed between the shell and the probe sleeve and the spring, and solve the problem of effective installation and coupling of the acoustic emission probe. After the acoustic emission probe and the probe installation mechanism are assembled, the probe sleeve is fixed in the guide cylinder of the shell, and the spring is in a compressed state, thus, the size of the combination of the acoustic emission probe and the probe installation mechanism is smaller than the size of the borehole so that the combination can be transmitted within the borehole. When the combination of the acoustic emission probe and the probe installation mechanism is transmitted to a predetermined position, the pin connecting the guide cylinder of the shell with the probe sleeve is pulled out to reduce the compression of the spring. Under the action of spring elastic restoring force, the shell and the probe sleeve move in the opposite direction, so that the top of the shell and the bottom of the probe sleeve are in close contact with the wall of the borehole, thereby ensuring the effective coupling between the acoustic emission probe and the wall of the borehole.

2. In the acoustic emission sensor of the present invention, the top of the shell and the bottom of the probe sleeve are both arc-shaped coupling surfaces matched with the wall of the borehole to ensure the coupling effect between the acoustic emission probe and the wall of the borehole, thereby enhancing the reliability of the monitoring and forecasting of rock (rock mass) stability and rock burst dynamic disaster.

3. In the acoustic emission sensor of the present invention, after monitoring is completed, the elastic force of the spring can be released by pulling out the baffle mounted on the lower spring sleeve. Then, under the action of the traction of the first rope, the lower end surface of the probe sleeve is separated from the inner wall of the borehole in order to facilitate the recovery of acoustic emission probes, thus achieving the reuse of acoustic emission sensors and saving monitoring costs.

4. In the acoustic emission sensor of the present invention, the size of the probe installation mechanism used in the transmission process is smaller than the size of the borehole, and the transmission rod of the transmission mechanism can be formed by connecting multiple transmission rods, the acoustic emission sensor of the present invention is not only easy to install, but also is unaffected by the depth and orientation of the borehole, having a wider range of application.

5. In the acoustic emission sensor of the present invention, the transmission mechanism adopted has been designed with a transmission roller to achieve rolling transmission during installation and recovery, thereby overcoming the frictional influence of the wall of the borehole during the installation, recycling and transmission, and ensuring the integrity of the acoustic emission sensor and the transmission cable.

6. In the acoustic emission sensor of the present invention, the connection between the connection bracket fixed to the shell and the nut is a rotational connection, the probe installation mechanism can achieve a small rotation within a certain range, so as to further ensure the top of the shell and the bottom of the probe sleeve are effectively coupled and contacted with the wall of the borehole.

7. The acoustic emission sensor of the present invention also has the characteristics of simple structure and convenient installation and disassembly, which can reduce the labor intensity and can save a lot of labor costs.

8. In the acoustic emission sensor of the present invention, in order to meet different requirements, multiple probe installation mechanisms can be connected by multiple transmission rods to achieve the purpose of arranging multiple acoustic emission probes in the same borehole, the end surface of each acoustic emission probe can be determined respectively according to monitoring requirements, thereby improving the monitoring efficiency of rock (rock mass) stability and rock burst dynamic disaster.

In the drawings, 1, shell; 1-1, semi-cylinder; 1-2, connection piece; 1-3, frame; 1-4, guide cylinder; 1-5, first pin hole; 1-6, fixed pulley; 2, probe sleeve; 2-1, notch; 2-2, second pin hole; 2-3, spring sleeve; 2-4, slot; 3, acoustic emission probe; 3-1, cable connector; 4, first rope; 5, end cap; 6, guide rod; 7, spring; 8, baffle; 9, connection bracket; 10, nut; 11, second rope; 12, pin; 13, third rope; 14, connection rod; 14-1, threaded section; 14-2, column section; 15, transmission rod; 15-1, connection hole; 15-2, connection screw hole; 15-3, first fastening screw; 16, roller component; 16-1, roller; 16-2, U-shaped installation plate; 16-3, axle; 16-4, roller sleeve; 16-5, second fastening screw.

DETAILED DESCRIPTION

The technical solutions of the present invention will be clearly and completely described through embodiments and with reference to the accompanying drawings. Obviously, the described embodiments are merely parts of the present invention, rather than all of the embodiments of the present invention. All other embodiments obtained by a person of ordinary skill in the art based on the embodiments of the present invention without creative efforts shall fall within the protection scope of the present invention.

Figure 1:
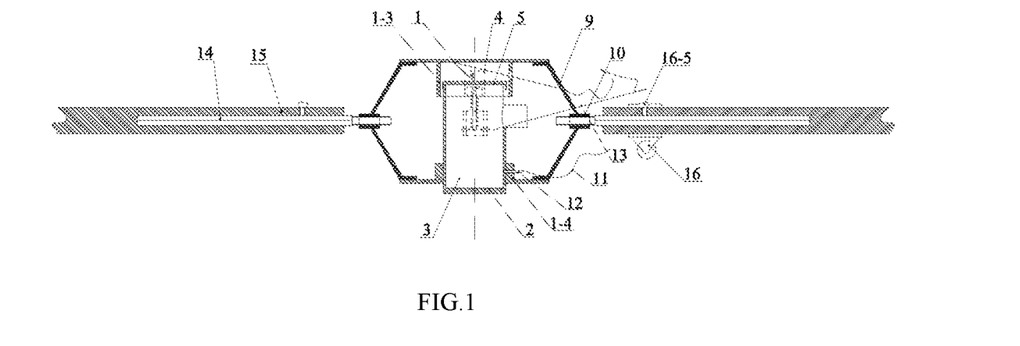
FIG. 1 is a structural schematic diagram of an acoustic emission sensor according to the present invention.

The acoustic emission sensor provided by this embodiment is shown in FIG. 1, including an acoustic emission probe 3, a probe installation mechanism, and a transmission mechanism transmitting a combination of the acoustic emission probe and the probe installation mechanism to a setting position in a borehole of a monitored rock mass; the number of the probe installation mechanisms and the number of the acoustic emission probes 3 are both one.

Figure 6:
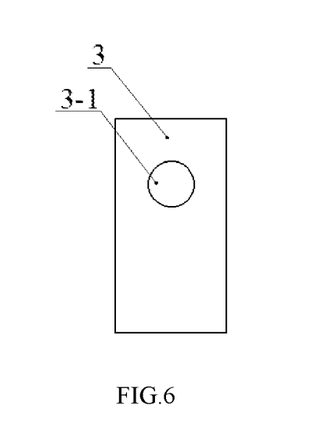
FIG. 6 is a schematic diagram of an acoustic emission probe in an acoustic emission sensor according to the present invention.
Figure 7:
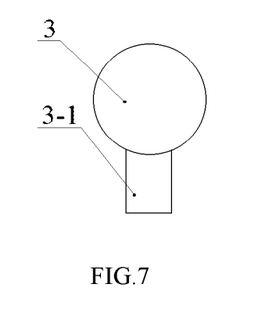
FIG. 7 is a top view of FIG. 6.

As shown in FIG. 6 and FIG. 7, the above-mentioned acoustic emission probe 3 has a cylindrical structure, the side of the acoustic emission probe 3 extends to form the cable connector 3-1, one end surface of the acoustic emission probe is coated with butter.

Figure 2:
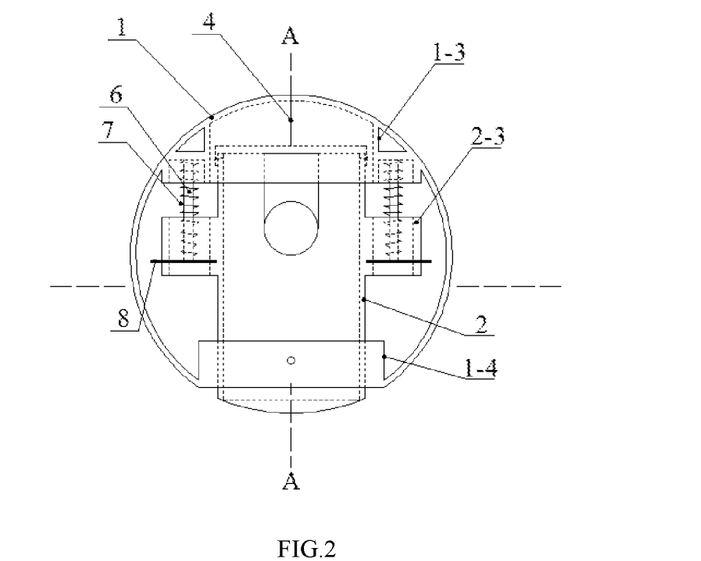
FIG. 2 is a schematic diagram of a combination of an acoustic emission probe and a probe installation mechanism in an acoustic emission sensor according to the present invention.
Figure 3:
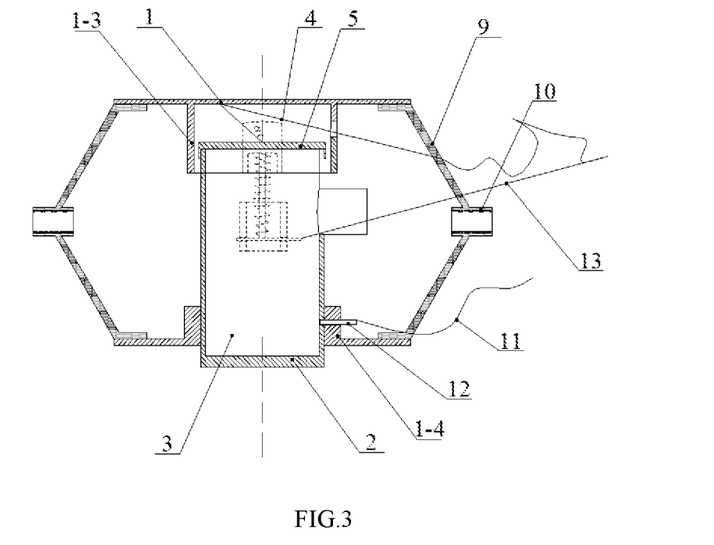
FIG. 3 is a sectional view in a direction of A-A of FIG. 2.

As shown in FIGS. 2 and 3, the probe installation mechanism includes a shell 1, a probe sleeve 2, an end cap 5, a guide rod 6, a spring sleeve 2-3, a spring 7, a baffle 8, a pin 12, and a fixed pulley component and a connection component. The springs 7 in this embodiment are symmetrically disposed along the circumference of the probe sleeve 2, the number of springs are two, and the number of baffles 8 are equal to the number of springs 7.

As shown in FIG. 2 to FIG. 5, the above-mentioned shell 1 is a thin-walled cylindrical body with two open ends, the shell is formed by two semi-cylinders 1-1 fixedly connected by connection pieces 1-2 and screws, the top of the shell is an arc surface matched with the arc of the borehole, a frame 1-3 and a guide cylinder 1-4 for combining with the probe sleeve 2 are provided in an inner hole of the shell, the frame 1-3 is located at a top of an inner wall of the shell; the guide cylinder 1-4 is located at a bottom of the inner wall of the shell, an inner hole of the guide cylinder is a through hole passing through a wall of the shell, and a first pin hole 1-5 is arranged on a wall of the guide cylinder, a centerline of the frame 1-3 is in line with a centerline of the guide cylinder 1-4 and is perpendicular to a centerline of the shell; two sides of the frame 1-3 are plate bodies.

Figure 8:
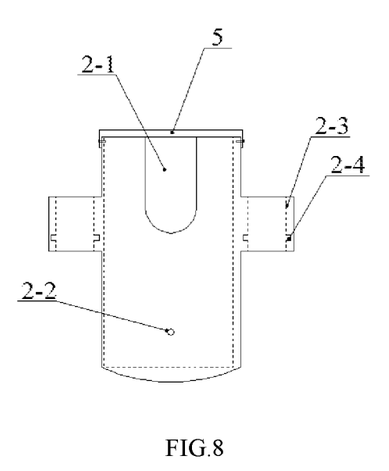
FIG. 8 is a structural schematic diagram of a probe sleeve in the probe installation mechanism.

As shown in FIG. 2, FIG. 3 and FIG. 8, the probe sleeve 2 is a cylinder with a closed lower end and an open upper end, a lower end surface of the probe sleeve is an arc surface matched with an arc of the borehole of the monitored rock mass, an inner hole of the probe sleeve is in clearance fit with the acoustic emission probe 3, and an outer shape of the probe sleeve is in clearance fit with the inner hole of the guide cylinder 1-4, a lower section of the probe sleeve is provided with a second pin hole 2-2 combined with the guide cylinder 1-4, an upper wall of the probe sleeve is provided with one U-shaped notch 2-1 for a cable connector of the acoustic emission probe to protrude; the spring sleeve 2-3 is a cylinder with two open ends, an inner wall of a lower end of the spring sleeve is provided with a slot 2-4 combined with the baffle 8 and is provided with a baffle outlet, the number of spring sleeves 2-3 are two, two spring sleeves are axially symmetrically fixed on an outer wall of the probe sleeve with respect to the centerline of the probe sleeve, and connecting line of projections of centerlines of the two spring sleeves on a horizontal plane is perpendicular to a projection of a centerline of the notch 2-1 on the horizontal plane.

Figure 4:
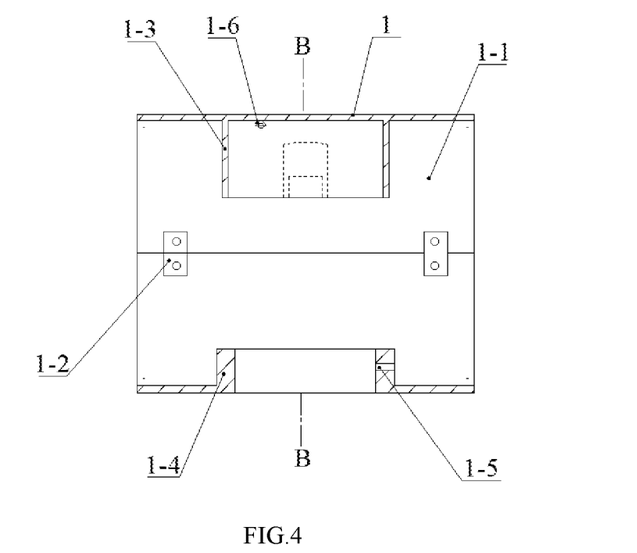
FIG. 4 is a structural schematic diagram of a shell in an acoustic emission sensor according to the present invention.
Figure 5:
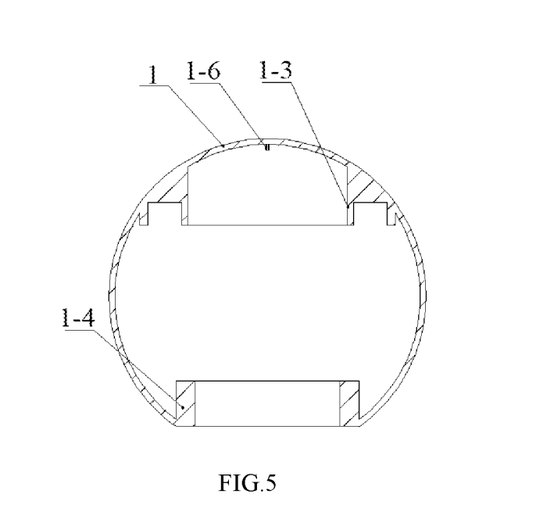
FIG. 5 is a sectional view in a direction of B-B of FIG. 4.

As shown in FIGS. 3 to 5, the fixed pulley component includes a fixed pulley 1-6 and a first rope 4, the fixed pulley 1-6 is installed on top of the inner wall of the shell and is located in the frame 1-3, a first end of the first rope 4 is connected with a central part of the end cap 5, and a second end of the first rope 4 extends out of the shell after passing through the fixed pulley; an installation site of the fixed pulley 1-6 on the top of the inner wall of the shell makes an included angle (a) between a section that is from a connection end of the first rope with the end cap 5 to a contact part of the fixed pulley and the centerline of the probe sleeve ranges from 0° to 45° when the first rope is in working condition.

In order to facilitate the operation of the baffle 8 and the pin 12, the probe installation mechanism in this embodiment further includes a second rope 11 and a third rope 13, the second rope 11 is fixedly connected with the pin 12, and the third rope 13 is fixedly connected with the baffle 8. In this embodiment, the first rope 4, the second rope 11, and the third rope 13 are all steel wire ropes. For the convenience of operation, the first rope 4 and the third rope 13 can be merged as one rope and then connected to a ground surface. In order to ensure the pulling sequence of the rope (first pull the third rope 13 out of the baffle, and then pull the first rope 4 to retrieve the probe), the length of the first rope 4 is three times more than the third rope 13 before the first rope 4 and the third rope 13 are merged.

Figure 9:
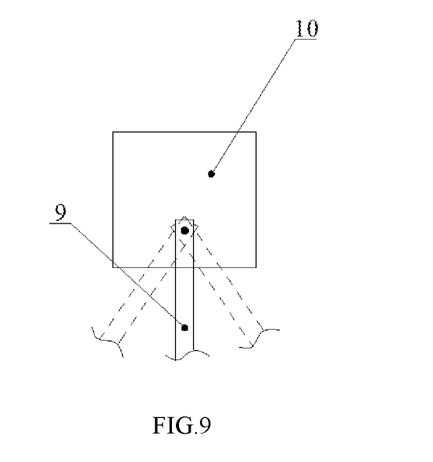
FIG. 9 is a schematic diagram of a connection mode between a nut and a connection bracket of a connection component in a probe installation mechanism.

As shown in FIG. 3 and FIG. 9, the connection components are two sets which are respectively mounted at two ends of the shell 1; the connection component includes a nut 10 and two sets of connection brackets 9, the number of each set of connection bracket is two; two ends of the connection bracket 9 are bent in two opposite directions to form a structure suitable for connection between the shell 1 and the nut 10; one end of the connection bracket 9 is welded in the inner side of the shell 1, and the other end is hinged with the outer wall of the nut 10 through rivets. Through the connection component, the transmission mechanisms can be installed at two ends of the shell 1 respectively, which not only facilitates the transmission of the acoustic emission sensor in the borehole, but also connects multiple probe installation mechanisms through the transmission rod to achieve the purpose of arranging a plurality of acoustic emission probes in the same borehole.

Figure 10:
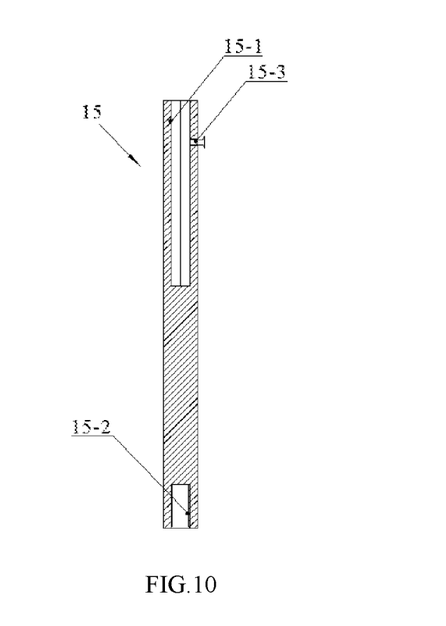
FIG. 10 is a structural schematic diagram of a transmission rod in a transmission mechanism.
Figure 11:
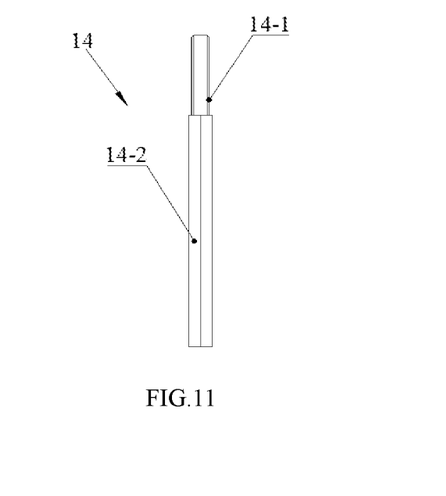
FIG. 11 is a structural schematic diagram of a connection rod in a transmission mechanism.
Figure 12:
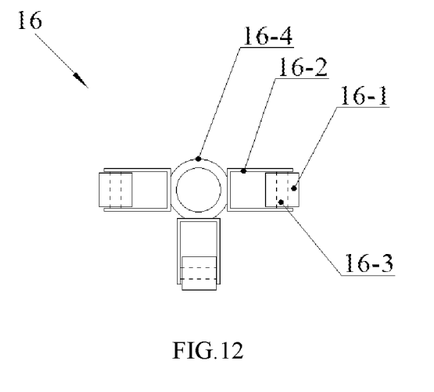
FIG. 12 is a structural schematic diagram of a roller component in a transmission mechanism.

As shown in FIGS. 10 to 12, transmission mechanism includes a transmission rod 15, a connection rod 14 and a roller component 16; a connection screw hole 15-2 is provided at a center of a first end of the transmission rod 15, and a connection hole 15-1 is provided at a center of a second end of the transmission rod 15, a first fastening screw 15-3 is provided on a hole wall of the connection hole, a type and a size of an internal thread of the connection screw hole are the same as a type and a size of an internal thread of the nut 10 in the connection component; the connection rod 14 includes a threaded section 14-1 and a column section 14-2, the connection rod is used for a connection of the transmission rod with the connection component and a connection between transmission rods, a type and a size of an external thread of the threaded section 14-1 are matched with a type and a size of the internal thread of the connection screw hole 15-2 provided on the transmission rod, a shape and a size of the column section 14-2 are matched with a shape and a size of the connection hole 15-1 provided in the transmission rod, when the column section 14-2 of the connection rod is inserted into the connection hole 15-1 of the transmission rod, the column section 14-2 of the connection rod and the connection hole 15-1 are fixed by the first fastening screw 15-3. The roller component 16 includes a roller 16-1, an U-shaped installation plate 16-2, an axle 16-3 and a roller sleeve 16-4; the number of rollers 16-1 are three, the number of the U-shaped installation plates 16-2 and the number of the axles 16-3 are the same as the number of the rollers, each roller 16-1 is respectively mounted on a corresponding axle, two ends of each axle 16-3 are respectively mounted on two side plates of a corresponding U-shaped installation plate 16-2 so that each roller is located between the two side plates of the corresponding U-shaped installation plate; a diameter of an inner hole of the roller sleeve 16-4 is larger than an outer diameter of the transmission rod 15, a second fastening screw 16-5 is arranged on a wall of the roller sleeve 16-4, each U-shaped installation plate is fixedly attached to an outer wall of the roller sleeve 16-4; centerlines of two U-shaped installation plates are in a straight line, and included angles between a centerline of remaining U-shaped installation plate and the centerlines of the two U-shaped installation plates are both 90°. Each transmission rod 15 is provided with one set of roller component 16, the roller sleeve 16-4 of the roller component is sleeved on the transmission rod 15 and is fixed by the second fastening screw 16-5.

As shown in FIG. 1 to FIG. 3, the assembly method of the above-mentioned acoustic emission sensor is as follows:

The acoustic emission probe 3 is installed in the probe sleeve 2, the end of the acoustic emission probe 3 coated with butter is in contact with the bottom of the probe sleeve, and the cable connector 3-1 of the acoustic emission probe 3 protrudes from the notch 2-1 arranged on the wall of the probe sleeve; the probe sleeve 2 installed with the acoustic emission probe is paced in the shell 1, the lower section of the probe sleeve is inserted into the guide cylinder 1-4 provided on the shell and the lower end of the probe sleeve is located outside the shell, the upper section of the probe sleeve is located in the frame 1-3 provided on the shell, the placement orientation of the probe sleeve 2 should make the cable connector 3-1 of the acoustic emission probe face an end of the shell; the end cap 5 covers the upper end surface of the probe sleeve 2 and is detachably connected to the probe sleeve; the number of the baffles 8 are two, two baffles are respectively installed in the slot 2-4 provided by the two spring sleeves and are connected with the third rope 13; the number of the guide rods 6 are two, the first ends of the two guide rods are respectively connected with two side plates of the frame 1-3 provided in the shell, and the second ends of the two guide rods are respectively inserted into the two spring sleeves; the number of springs 7 are two, two springs are respectively sleeved on the two guide rods, the first ends of the two springs are respectively connected with plate bodies of corresponding parts of the frame, and the second ends of the two springs are respectively contacted with corresponding baffles 8; the first end of the first rope 4 is connected with the central part of the end cap 5, and the second end of the first rope 4 extends out of the shell after passing through the fixed pulley; the pin 12 connected with the second rope 11 is inserted into the first pin hole 1-5 of the guide cylinder and the second pin hole 2-2 of the probe sleeve to connect the probe sleeve with the guide cylinder, the spring 7 is in a compressed state after the acoustic emission probe is combined with the probe installation mechanism; then the column section 14-2 of the connection rod is inserted into the connection hole 15-1 of the transmission rod, the column section 14-2 of the connection rod and the connection hole are fixed by the first fastening screw 15-3, the roller sleeve 16-4 of the roller component is sleeved on the transmission rod 15 and is fixed with the second fastening screw 16-5, and then the thread section 14-1 of the connection rod and the nut 10 are combined to realize the connection between the probe installation mechanism and the transmission mechanism. The assembly of the acoustic emission sensor is completed.

Figure 13:
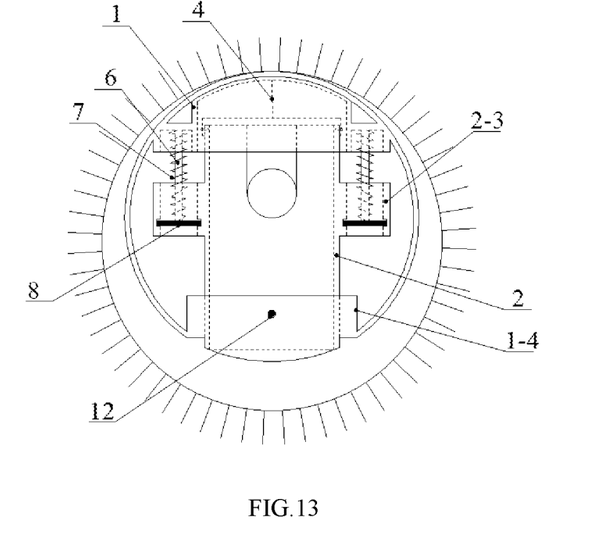
FIG. 13 is a schematic diagram of the probe installation mechanism with an acoustic emission probe mounted thereon in an installed state.
Figure 14:
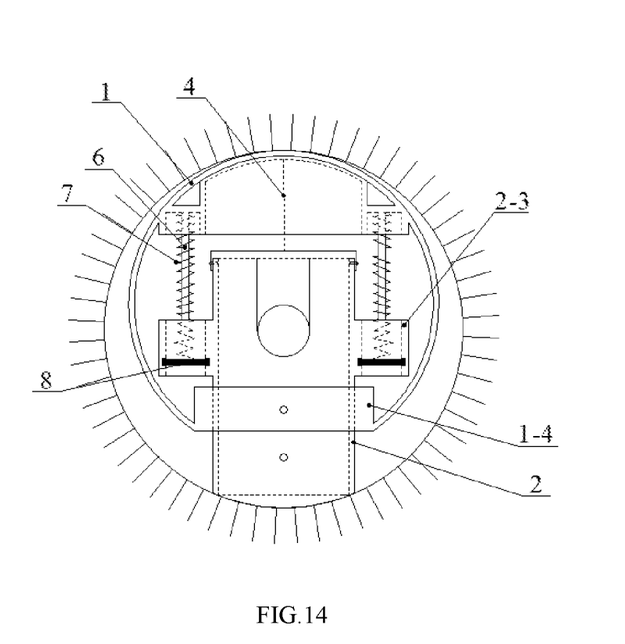
FIG. 14 is a schematic diagram of the probe installation mechanism with an acoustic emission probe mounted thereon in a monitoring state.

As shown in FIG. 1, FIG. 13, and FIG. 14, the process of using the acoustic emission sensor is as follows:

Putting the combination of acoustic emission probe and probe installation mechanism into the borehole, pushing the transmission rod 15, transmitting the combination of acoustic emission probe and probe installation mechanism to the position to be monitored, pulling the second rope 11 to pull the pin 12 out of the first pin hole 1-5 and the second pin hole 2-2, the pressure on the spring 7 is then reduced, under the elastic restoring force of the spring 7, the shell 1 and the probe sleeve 2 move in opposite directions, so that the top of the shell 1 and the lower end surface of the probe sleeve 2 are respectively in close contact with the wall of the borehole and press the wall of the borehole; since the top of the shell 1 and the lower end surface of the probe sleeve 2 are arc-shaped surfaces matched with the wall of the borehole, so that the effective contact between the acoustic emission probe and the wall of the borehole can be ensured, and the signal received by the acoustic emission probe can be guaranteed to be effective and stable. In addition, the connection bracket 9 fixedly connected to the shell 1 is in rotational connection with the nut 10, making the acoustic emission sensor realize small-scale rotation during installation, and ensuring that the top of the shell 1 and the lower end surface of the probe sleeve are in effective contact with the borehole wall. After the acoustic emission probe is placed in the setting position of the borehole, the acoustic emission probe can monitor the condition of the rock (rock mass) during construction, the monitoring signal can be transmitted to the ground workstation through the cable, and the monitoring signal is displayed through the computer in the ground workstation.

Figure 15:
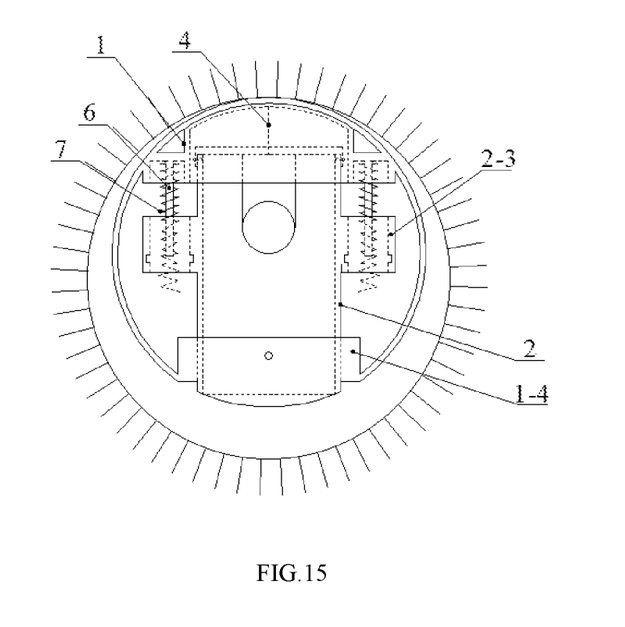
FIG. 15 is a schematic diagram of the probe installation mechanism with an acoustic emission probe mounted thereon in a recycling state.

As shown in FIG. 15, when the monitoring process is completed, pulling the third rope 13 to pull out the baffle 8 from the slot 2-4 so that the two springs 7 are in a free state, and pulling the first rope 4 to separate the lower end surface of the probe sleeve from the inner wall of the borehole, thus, the overall size of the combination of the acoustic emission probe and the probe installation mechanism is again smaller than the size of the borehole, the combination of the acoustic emission probe and the probe installation mechanism can be pulled out of the borehole through the transmission rod 15 so that the acoustic emission probe and the probe installation mechanism can be recycled.

In addition, a plurality of transmission rods 15 may be sequentially connected through the connection rods 14 so as to meet the depth requirement for borehole, so as not to be affected by the depth and orientation of the mine rock (rock mass), and expand the application range of the acoustic emission sensor.

The welding fixing method in the present embodiment can also be replaced by bolt fixing, integrated molding and other fixed connection methods, and the screw fixing method can also be replaced by other detachable fixing methods such as snap-fitting and magnetic connectors.

What is claimed is:

1. An acoustic emission sensor, comprising at least one acoustic emission probe, at least one probe installation mechanism, and a transmission mechanism transmitting a combination of the acoustic emission probe and the probe installation mechanism to a setting position in a borehole of a monitored rock mass, and wherein a number of the probe installation mechanism is equal to a number of the acoustic emission probe;

wherein the probe installation mechanism comprises a shell, a probe sleeve, an end cap, two guide rods, two spring sleeves, two springs, and two baffles, a pin, a fixed pulley component and a connection component;

wherein the shell is a thin-walled cylindrical body with two open ends, a frame and a guide cylinder for combining with the probe sleeve are provided in an inner hole of the shell, the frame is located at a top of an inner wall of the shell, and the guide cylinder is located at a bottom of the inner wall of the shell, an inner hole of the guide cylinder is a through hole passing through a wall of the shell, and a first pin hole is arranged on a wall of the guide cylinder, a centerline of the frame is in line with a centerline of the guide cylinder and is perpendicular to a centerline of the shell;

wherein the probe sleeve is a cylinder with a closed lower end and an open upper end, an inner hole of the probe sleeve is in clearance fit with the acoustic emission probe, and an outer shape of the probe sleeve is in clearance fit with the inner hole of the guide cylinder, a lower end surface of the probe sleeve is an arc surface matched with an arc of the borehole of the monitored rock mass, a lower section of the probe sleeve is provided with a second pin hole combined with the guide cylinder, an upper wall of the probe sleeve is provided with one or two notches for a cable connector of the acoustic emission probe to protrude, if the upper wall of the probe sleeve is provided with two notches, the two notches are axially symmetrically distributed with respect to a centerline of the probe sleeve;

wherein each of the spring sleeves is a cylinder with two open ends, an inner wall of a lower end of each of the spring sleeves is provided with a slot combined with each of the baffles and is provided with a baffle outlet, the two spring sleeves are axially symmetrically fixed on an outer wall of the probe sleeve with respect to the centerline of the probe sleeve, and connecting line of projections of centerlines of the two spring sleeves on a horizontal plane is perpendicular to a projection of a centerline of the notch on the horizontal plane, two sets of connection components are respectively installed at two ends of the shell;

wherein the acoustic emission probe is installed in the probe sleeve, the cable connector of the acoustic emission probe extends from the notch arranged on the wall of the probe sleeve; the probe sleeve installed with the acoustic emission probe is paced in the shell, the lower section of the probe sleeve is inserted into the guide cylinder provided on the shell and a lower end of the probe sleeve is located outside the shell, an upper section of the probe sleeve is located in the frame provided on the shell, a placement orientation of the probe sleeve makes the cable connector of the acoustic emission probe face one of the two ends of the shell;

wherein the end cap covers an upper end surface of the probe sleeve and is detachably connected to the probe sleeve;

wherein the two baffles are respectively installed in the slot provided by the two spring sleeves and are connected with a third rope;

wherein first ends of the two guide rods are respectively connected with two side plates of the frame provided in the shell, and second ends of the two guide rods are respectively inserted into the two spring sleeves;

wherein the two springs are respectively sleeved on the two guide rods, first ends of the two springs are respectively connected with plate bodies of corresponding parts of the frame, and second ends of the two springs are respectively contacted with corresponding baffles;

wherein the fixed pulley component comprises a fixed pulley and a first rope, the fixed pulley is installed on the top of the inner wall of the shell and is located in the frame;

wherein a first end of the first rope is connected with a central part of the end cap, and a second end of the first rope extends out of the shell after passing through the fixed pulley;

wherein a second rope is connected to the pin, the pin is inserted into the first pin hole of the guide cylinder and the second pin hole of the probe sleeve to connect the probe sleeve with the guide cylinder so that the springs are in a compressed state;

wherein the transmission mechanism is connected to the connection component mounted on the shell.

2. The acoustic emission sensor according to claim 1, wherein the connection component comprises a nut and at least two sets of connection brackets, a first end of each of the connection brackets is evenly distributed around an outer wall of the nut and is hinged with the outer wall of the nut, a second end of each of the connection brackets is fixedly connected with the shell.

3. The acoustic emission sensor according to claim 2, wherein the transmission mechanism comprises a transmission rod, a connection rod and a roller component;

wherein a connection screw hole is provided at a center of a first end of the transmission rod, and a connection hole is provided at a center of a second end of the transmission rod, a first fastening screw is provided on a wall of the connection hole, a type and a size of an internal thread of the connection screw hole are the same as a type and a size of an internal thread of the nut in the connection component;

wherein the connection rod comprises a threaded section and a column section, the connection rod is used for a connection of the transmission rod with the connection component and a connection between transmission rods, a type and a size of an external thread of the threaded section are matched with a type and a size of the internal thread of the connection screw hole provided on the transmission rod, a shape and a size of the column section are matched with a shape and a size of the connection hole provided in the transmission rod, when the column section of the connection rod is inserted into the connection hole of the transmission rod, the column section of the connection rod and the connection hole are fixed by the first fastening screw;

wherein the roller component comprises a roller, an U-shaped installation plate, an axle and a roller sleeve, a number of rollers are two or three, a number of the U-shaped installation plate and a number of axle are the same as a number of the rollers, each of the rollers is respectively mounted on a corresponding axle, two ends of each axle are respectively mounted on two side plates of a corresponding U-shaped installation plate so that each roller is located between the two side plates of the corresponding U-shaped installation plate; a diameter of an inner hole of the roller sleeve is larger than an outer diameter of the transmission rod, a second fastening screw is arranged on a wall of the roller sleeve, each U-shaped installation plate is fixedly attached to an outer wall of the roller sleeve; when the number of the U-shaped installation plate are two, an included angle between centerlines of the two U-shaped installation plates is 120° to 135°; when the number of the U-shaped installation plate are three, centerlines of two U-shaped installation plates are in a straight line, and included angles between a centerline of remaining U-shaped installation plate and the centerlines of the two U-shaped installation plates are both 90°;

wherein each transmission rod is provided with at least one set of roller component, the roller sleeve of the roller component is sleeved on the transmission rod and is fixed by the second fastening screw.

4. The acoustic emission sensor according to claim 1, wherein the shell is formed by a combination of two semi cylinders.

5. The acoustic emission sensor according to claim 1, wherein an installation site of the fixed pulley on the top of the inner wall of the shell makes an included angle ($\alpha$) between a section that is from a connection end of the first rope with the end cap to a contact part of the fixed pulley and the centerline of the probe sleeve ranges from 0° to 45° when the first rope is in working condition.

6. The acoustic emission sensor according to claim 4, wherein an installation site of the fixed pulley on the top of the inner wall of the shell makes an included angle ($\alpha$) between a section that is from a connection end of the first rope with the end cap to a contact part of the fixed pulley and the centerline of the probe sleeve ranges from 0° to 45° when the first rope is in working condition.

7. The acoustic emission sensor according to claim 1, wherein the notch from which the cable connector of the acoustic emission probe extends and provided on an upper end of the probe sleeve is a U-shaped notch.

8. The acoustic emission sensor according to claim 6, wherein the notch from which the cable connector of the acoustic emission probe extends and provided on an upper end of the probe sleeve is a U-shaped notch.

9. The acoustic emission sensor according to claim 1, wherein a lower end face of the acoustic emission probe in contact with a bottom of the probe sleeve is coated with a coupling agent.

10. The acoustic emission sensor according to claim 8, wherein a lower end surface of the acoustic emission probe in contact with a bottom of the probe sleeve is coated with a coupling agent.

11. The acoustic emission sensor according to claim 2, wherein the shell is formed by a combination of two semi cylinders.

12. The acoustic emission sensor according to claim 3, wherein the shell is formed by a combination of two semi cylinders.

13. The acoustic emission sensor according to claim 2, wherein an installation site of the fixed pulley on the top of the inner wall of the shell makes an included angle ($\alpha$) between a section that is from a connection end of the first rope with the end cap to a contact part of the fixed pulley and the centerline of the probe sleeve ranges from 0° to 45° when the first rope is in working condition.

14. The acoustic emission sensor according to claim 3, wherein an installation site of the fixed pulley on the top of the inner wall of the shell makes an included angle ($\alpha$) between a section that is from a connection end of the first rope with the end cap to a contact part of the fixed pulley and the centerline of the probe sleeve ranges from 0° to 45° when the first rope is in working condition.

15. The acoustic emission sensor according to claim 11, wherein an installation site of the fixed pulley on the top of the inner wall of the shell makes an included angle ($\alpha$) between a section that is from a connection end of the first rope with the end cap to a contact part of the fixed pulley and the centerline of the probe sleeve ranges from 0° to 45° when the first rope is in working condition.

16. The acoustic emission sensor according to claim 2, wherein the notch from which the cable connector of the acoustic emission probe extends and provided on an upper end of the probe sleeve is a U-shaped notch.

17. The acoustic emission sensor according to claim 3, wherein the notch from which the cable connector of the acoustic emission probe extends and provided on an upper end of the probe sleeve is a U-shaped notch.

18. The acoustic emission sensor according to claim 15, wherein the notch from which the cable connector of the acoustic emission probe extends and provided on an upper end of the probe sleeve is a U-shaped notch.

19. The acoustic emission sensor according to claim 2, wherein a lower end face of the acoustic emission probe in contact with a bottom of the probe sleeve is coated with a coupling agent.

20. The acoustic emission sensor according to claim 3, wherein a lower end face of the acoustic emission probe in contact with a bottom of the probe sleeve is coated with a coupling agent.

* * * * *

UNITED STATES PATENT AND TRADEMARK OFFICE
CERTIFICATE OF CORRECTION

PATENT NO. : 10,794,869 B2  
APPLICATION NO. : 16/016829  
DATED : October 6, 2020  
INVENTOR(S) : Jianfeng Liu et al.

Page 1 of 1

It is certified that error appears in the above-identified patent and that said Letters Patent is hereby corrected as shown below:

On the Title Page

The INVENTOR(S) should read as below:  
Jianfeng LIU, Chengdu, CN;  
Guosheng DING, Beijing, CN;  
Zhide WU, Beijing, CN;  
Huining XU, Chengdu, CN;  
Jianliang PEI, Chengdu, CN;  
Lina RAN, Beijing, CN;  
Lu WANG, Chengdu, CN;  
Chunping WANG, Chengdu, CN;  
Yanxia GOU, Beijing, CN;  
Xiaozhang LEI, Chengdu, CN;  
Wenxi FU, Chengdu, CN;  
Jianhui DENG, Chengdu, CN;  
Min ZHANG, Beijing, CN Signed and Sealed this  
Fifteenth Day of December, 2020

Andrei Iancu  
*Director of the United States Patent and Trademark Office*